US009042428B2

(12) United States Patent
Wang

(10) Patent No.: US 9,042,428 B2
(45) Date of Patent: May 26, 2015

(54) EFFICIENT FREQUENCY DOMAIN (FD) MMSE EQUALIZATION WEIGHT UPDATES IN A MULTI-STAGE PARALLEL INTERFERENCE CANCELLATION RECEIVER

(75) Inventor: Yi-Pin Eric Wang, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 269 days.

(21) Appl. No.: 13/463,974

(22) Filed: May 4, 2012

(65) Prior Publication Data
US 2013/0294494 A1    Nov. 7, 2013

(51) Int. Cl.
| H04B 1/00 | (2006.01) |
| H04B 1/7105 | (2011.01) |
| H04B 1/7107 | (2011.01) |
| H04J 11/00 | (2006.01) |
| H04B 7/04 | (2006.01) |
| H04B 7/08 | (2006.01) |

(52) U.S. Cl.
CPC ........ H04B 1/71055 (2013.01); H04B 1/71072 (2013.01); H04B 1/71075 (2013.01); H04J 11/004 (2013.01); H04B 7/0413 (2013.01); H04B 7/0854 (2013.01)

(58) Field of Classification Search
CPC ............. H04B 1/71055; H04B 7/0615; H04B 7/0413; H04B 1/712; H04B 7/0634; H04B 7/0842; H04B 17/0057; H04B 17/0042; H04B 1/38
USPC .......................................................... 375/148
See application file for complete search history.

(56) References Cited

U.S. PATENT DOCUMENTS

| 2002/0087525 A1* | 7/2002 | Abbott et al. ...................... 707/3 |
| 2004/0176051 A1* | 9/2004 | Papadimitriou et al. ...... 455/101 |
| 2004/0246927 A1* | 12/2004 | Wei et al. ....................... 370/335 |
| 2005/0043943 A1* | 2/2005 | Wang et al. .................... 704/201 |

(Continued)

OTHER PUBLICATIONS

Kafle, et al: "Iterative Semiblind Multiuser Receivers for a Space-Time Block-Coded MC-CDMA Uplink System". IEEE Transactions on Vehicular Technology, vol. 53, No. 3, May 2004.

(Continued)

*Primary Examiner* — Chieh M Fan
*Assistant Examiner* — Sarah Hassan

(57) ABSTRACT

A system and method to more efficiently compute updated Frequency Domain (FD) Minimum Mean Squared Error (MMSE) equalization weights in a multi-stage Parallel Interference Cancellation (PIC) receiver after initial interference cancellation. The updated equalization weights (which are to be used during re-equalization) can be obtained using the old equalization weights already computed for initial interference cancellation. There is no need to invert an $n_R$ by $n_R$ matrix (where $n_R$ is the number of receive antennas) at each stage of the PIC receiver during each iteration of equalization and decoding operations. Rather, the matrix to be inverted to obtain updated equalization weights may be of the dimension n×n (where "n" equals the total number of transmission layers in a transmission scheme used in the wireless network). This significantly reduces complexity of determining updated equalization weights during FD MMSE equalization, thereby saving computational resources in a digital receiver performing such equalization.

20 Claims, 4 Drawing Sheets

(56) References Cited

U.S. PATENT DOCUMENTS

| | | | |
|---|---|---|---|
| 2005/0111780 A1* | 5/2005 | Joyner et al. | 385/14 |
| 2005/0170802 A1* | 8/2005 | Oh et al. | 455/226.1 |
| 2005/0185594 A1* | 8/2005 | Horneman et al. | 370/252 |
| 2007/0110135 A1* | 5/2007 | Guess et al. | 375/148 |
| 2008/0064431 A1* | 3/2008 | Zangi | 455/522 |

OTHER PUBLICATIONS

Kawamoto, et al: "Performance Comparisons Between OFDM and DS-CDMA Radio Access Using MIMO Multiplexing in Multi-path Fading Channels". IP Radio Network Development Department, NTT DoCoMo, Inc. Japan, 2005.

Axnas, et al: "Successive Interference Cancellation Techniques for LTE Downlink". 2011 IEEE $22^{nd}$ International Symposium on Personal, Indoor and Mobile Radio Communications.

Laot, C., R. Le Bidan and D. Leroux; "Low-complexity MMSE turbo equalization: a possible solution for EDGE," IEEE Trnas. Wireless Commun., vol. 4, No. 3, pp. 965-974, May 2005.

Park, C., Y-P.E. Wang, G. Jöngren, and D. Hammarwall, "Evolution of uplink MIMO for IMT-Advanced", IEEE Commun. Magazine, vol. 49, No. 2, pp. 112-121, Feb. 2011.

* cited by examiner

EFFICIENT FREQUENCY DOMAIN (FD) MMSE EQUALIZATION WEIGHT UPDATES IN A MULTI-STAGE PARALLEL INTERFERENCE CANCELLATION RECEIVER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present invention relates to interference cancellation in a wireless receiver. More particularly, and not by way of limitation, the present invention is directed to a Frequency Domain (FD) Minimum Mean Squared Error (MMSE) equalization in a multi-stage Parallel Interference Cancellation (PIC) receiver.

BACKGROUND

With ever-increasing demand for wireless communication and broadband services, there is an ongoing evolution of Third Generation (3G) and Fourth Generation (4G) cellular networks like High Speed Packet Access (HSPA), Evolution-Data Optimized (EV-DO), Long Term Evolution (LTE), Worldwide Interoperability for Microwave Access (WiMAX), etc., to support ever-increasing performance with regard to capacity, peak bit rates and coverage. In case of a mobile communication environment, such as Third Generation Partnership Project's (3GPP) LTE network, the Evolved Universal Terrestrial Radio Access (EUTRA) or Evolved Universal Terrestrial Radio Access Network (E-UTRAN) air interface for LTE may support wireless broadband data service at a rate of up to 300 Mbps in the downlink and 75 Mbps in the uplink. Due to increasing popularity of multimedia communications over wireless networks, emerging technologies like Multiple Input Multiple Output (MIMO) have been widely used in modern mobile communication environment (e.g., the LTE network) to meet the demand for higher data rate and better cell coverage without increasing average transmit power or frequency bandwidth. MIMO also improves uplink/downlink peak rates, cell coverage, as well as cell throughput. In MIMO, multiple spatial layers are constructed to deliver multiple data streams on a given frequency-time resource, thereby linearly increasing the channel capacity.

It is noted here that MIMO is a spatial diversity scheme in which multiple antennas are used at the transmitter and/or the receiver end. Like time diversity (different time slots and channel coding) and frequency diversity (different channels, spread spectrum, and Orthogonal Frequency Division Multiplexing (OFDM)), spatial diversity mode can also make radio communication more robust, even with varying channels. A multiple antenna based spatial diversity technology can also be used to increase the data rate (known as "spatial multiplexing"). In spatial multiplexing, data may be divided into separate streams or layers; the streams are then transmitted independently via separate antennas. When the data rate is to be increased for a single User Equipment (UE), the MIMO scheme is referred to as Single User MIMO (SU-MIMO). On the other hand, when individual data streams are assigned to multiple users (or UE's), it is called Multi User MIMO (MU-MIMO). The MU-MIMO may be useful in the uplink because the complexity on the UE side can be kept at a minimum by using only one transmit antenna per UE.

FIG. 1 illustrates an exemplary MIMO signal detection system 10. As shown in FIG. 1, MIMO transmitted signals/symbols 12 may travel through a MIMO channel 14 and be received (as indicated by arrow 16) at a receiver/detector 17. The output of the detector 17 may comprise detected signals 18 corresponding to the transmitted signals 12. For ease of discussion and sake of simplicity, the detector 17 is shown to detect a single MIMO signal using a Frequency Domain (FD) equalization and demodulation unit 19 (conveniently referred to as "equalization unit" in the context of discussion of FIG. 1), a decoder 20, a signal regenerator 21, and an interference canceller 22. In the context of FIG. 1, the components 19 through 22 may perform detection of a single MIMO layer signal. In practical implementations (as discussed in more detail with reference to the receiver 62 in FIG. 4), however, the detector 17 may include multiple parallel stages for interference cancellation, and each stage may in turn include multiple layer-specific MIMO signal detectors for each received MIMO layer signal. Each such MIMO signal detector may include an equalization unit (similar to the unit 19), a decoder unit (similar to the decoder 20), and a signal regenerator unit (similar to the signal regenerator 21). Outputs of all MIMO signal detectors in a stage may be received at an interference canceller unit (similar to the interference canceller 22) to provide interference cancellation for the received MIMO signals 16. A more detailed discussion of MIMO signal detection through parallel interference cancellation is provided later hereinbelow with reference to FIG. 4.

It is understood that each MIMO signal may carry a transport block consisting of a number of information bits. The information bits in a transport block are coded using a turbo code to produce a sequence of encoded bits, often referred to as a codeword. The encoded bits may be interleaved or scrambled to produce a sequence of channel bits. The channel bits are mapped to modulation symbols, which constitute a MIMO signal. It is noted here that the terms "signal" and "symbol" may be used interchangeably herein for the sake of convenience and ease of discussion, even though a MIMO transmitted signal may contain more than one symbol. Furthermore, as used herein, the term "symbol" may refer to information content transmitted by a single antenna in a single transmission, although each such "symbol" may include a plurality of encoded bits and multiple such "symbols" may be serially concatenated as part of the single transmission from the antenna. In case of an LTE network, for example, such transmission may include a radio frame having one or more subframes (not shown). Also in case of an LTE network, for example, the MIMO channel 14 may receive the MIMO signals 12 transmitted at different MIMO layers by, for example, different UE's. The base station or evolved Node-B (eNodeB or eNB) (not shown) in the LTE network may include the receiver/detector 17 to detect these MIMO signals received from the channel 14. Because MIMO signals/symbols 12 are transmitted via the same channel 14, transmissions using cross components not equal to zero (0) may mutually influence one another and give rise to Inter Symbol Interference (ISI). If channel transmission matrix (or frequency response) H of the MIMO channel 14 is known, these cross components can be estimated at the receiver (which could be an eNB or a UE or both, depending on MIMO implementation) using the known symbols transmitted from the multiple transmit antennas. After obtaining an estimate of the channel transmission matrix H, the receiver reports the channel status to the transmitter via a special feedback channel (e.g., in case of eNB as a MIMO transmitter and UE as a MIMO receiver, the channel feedback may be sent from a UE to a base station via the Physical Uplink Control Channel (PUCCH) or the Physical Uplink Shared Channel (PUSCH) in 3G and 4G cellular networks), thereby making it possible for the transmitter to optimize MIMO transmissions by adapting to changing channel conditions. In any event, the receiver preferably initially performs equalization before carrying out demodulation and decoding.

In the context of FIG. 1, the receiver 17 may be a turbo equalization receiver that combines channel equalization and decoding in an iterative detection scheme, which provides soft symbol (i.e., computed symbol) based interference cancellation through interference canceller 22. In a soft symbol based interference cancellation scheme, the amount of interference cancellation depends on the reliability of the symbols estimated by the signal regenerator 21. These soft estimated symbols are formed or computed using the decoder output Log Likelihood Ratios (LLRs) about the encoded bits. In a turbo equalizer, equalization and decoding operations are repeated several times on the same set of received symbols. Each iteration (of equalization and decoding operations) is carried out by a module supplied with channel observations H as well as with a priori information on the coded bits (in the transmitted symbols) in the LLR form delivered by the decoder unit of the previous module. For the sake of clarity, in the discussion herein, the term "turbo equalizer" (or "turbo equalization receiver") may be used to refer to the receiver or detector 17 (or similar such entity such as, e.g., the receiver 62 in FIG. 4) as a whole, whereas the term "equalizer" may be used to refer to only the equalization part (e.g., the equalization unit 19 in FIG. 1) of the turbo equalizer.

It is understood that if the symbols are estimated very reliably (e.g., by the signal regenerator 21 using outputs from the decoder 20), then interference can be largely removed. In contrast, if the estimated symbols are not very reliable, then only a small portion of the interference is removed and re-equalization may be needed. A turbo equalizer may be a multi-stage Parallel Interference Cancellation (PIC) receiver in which the received signal may be re-equalized at a successive stage after interference cancellation at the initial stage. In this case, the equalization weights (or coefficients) applied in the equalizer (e.g., similar to the equalization unit 19) of that successive stage may be adaptive to the residual interference characteristics. With updated equalization weights optimized for the characteristics of the residual interference, the equalizer can be more effective (during re-equalization) in suppressing whatever dominant interference is left after initial interference cancellation.

However, adapting equalization weights in every turbo equalization receiver stage may consume significant computation resources. Typically, equalization weight computation involves matrix inversion or solving linear equation using, e.g., the Gauss-Seidel algorithm. The size of the matrix that needs to be inverted is $n_R$ by $n_R$, where $n_R$ is the number of receive antennas (e.g., in case of FIG. 1, $n_R$ is the number of receive antennas receiving the MIMO signals 16). Furthermore, equalization weights may be needed for each subcarrier and each MIMO layer. However, a number of neighboring subcarriers may share the same equalization weights.

SUMMARY

As discussed above, in an adaptive equalization scheme, computation of equalization weights at each iteration may be computational resource intensive because of the need to invert an $n_R$ by $n_R$ matrix, where $n_R$ is the number of receive antennas. Solving for the equalization weights in each of the turbo equalization stages may not be feasible due to the limited computation resources in a digital receiver. Such computations become especially challenging when the number of receive antennas is large (e.g., 4 or higher).

It is therefore desirable to obtain the new or updated equalization weights (after initial interference cancellation) with much reduced complexity. It is also desirable that the reduced complexity solution be applicable to both LTE uplink and downlink receptions, as well as to other standards whenever Frequency Domain (FD) Minimum Mean Squared Error (MMSE) equalization is used within a multi-stage Parallel Interference Cancellation (PIC) receiver.

Particular embodiments of the present disclosure provide a solution to the above-mentioned problem of computational complexity when determining updated equalization weights in current multi-stage turbo equalizers. Particular embodiments allow updated MMSE equalization weights to be computed more efficiently in a multi-stage PIC receiver after initial interference cancellation. In particular embodiments, the updated equalization weights (which are to be used during re-equalization) can be obtained using the old equalization weights already computed for initial interference cancellation. Thus, there is no need to invert an $n_R$ by $n_R$ matrix at each stage of the turbo equalizer during each iteration of equalization and decoding operations.

In one embodiment, a method of providing FD MMSE equalization in a multi-antenna wireless communication unit having a multi-stage PIC receiver and operating in a wireless network that supports multiple transmission layers. The method comprises the steps of: (i) using the PIC receiver, performing initial interference suppression for a total signal received from all receive antennas in the communication unit, the initial interference suppression being performed at each transmission layer-specific detector unit in a first stage of the PIC receiver using transmission layer-specific initial equalization weights applied to the total signal, wherein the total signal includes all signals received by each receive antenna for all transmission layers at a predetermined subcarrier, and wherein the initial interference suppression provides a corresponding equalized layer-specific signal for each transmission layer; (ii) using the PIC receiver, processing at least one equalized layer-specific signal to obtain a cleaned-up version of the total signal as a result of initial interference cancellation performed at the first stage of the PIC receiver; and (iii) through a second stage of the PIC receiver, applying corresponding transmission layer-specific updated equalization weights to the cleaned-up version of the total signal, wherein the second stage is coupled to the first stage and wherein the transmission layer-specific updated equalization weights are determined without inverting a covariance matrix associated with the cleaned-up version of the total signal.

In another embodiment, a multi-stage PIC receiver for use in a multi-antenna wireless communication unit provides FD MMSE equalization when the communication unit is operating in a wireless network that supports multiple transmission layers. The multi-stage PIC receiver is configured to: (i) perform initial interference suppression for a total signal received from all receive antennas in the communication unit, the initial interference suppression being performed at each transmission layer-specific detector unit in a first stage of the PIC receiver using transmission layer-specific initial equalization weights applied to the total signal, wherein the total signal includes all signals received by each receive antenna for all transmission layers at a predetermined subcarrier, and wherein the initial interference suppression provides a corresponding equalized layer-specific signal for each transmission layer; (ii) process at least one equalized layer-specific signal to obtain a cleaned-up version of the total signal as a result of initial interference cancellation performed at the first stage of the PIC receiver; (iii) determine transmission layer-specific updated equalization weights by using the transmission layer-specific initial equalization weights; and (iv) apply corresponding transmission layer-specific updated equalization weights to the cleaned-up version of the total signal through a second stage of the PIC receiver.

In another embodiment, a wireless communication unit is configured to operate in a wireless network that supports multiple transmission layers. The communication unit comprises: a plurality of receive antennas, wherein each receive antenna in the plurality of receive antennas is configured to receive signals for all transmission layers; and a multi-stage PIC receiver coupled to the plurality of receive antennas. The multi-stage PIC receiver is configured to: (i) receive a total signal from all receive antennas in the plurality of receive antennas, wherein the total signal includes all signals received by each receive antenna for all transmission layers at a predetermined subcarrier, (ii) perform initial interference suppression for the total signal at each transmission layer-specific detector unit in a first stage of the PIC receiver using transmission layer-specific initial equalization weights applied to the total signal, wherein the initial interference suppression provides a corresponding equalized layer-specific signal for each transmission layer, (iii) process at least one equalized layer-specific signal to obtain a cleaned-up version of the total signal as a result of initial interference cancellation performed at the first stage of the PIC receiver, and (iv) apply corresponding transmission layer-specific updated equalization weights to the cleaned-up version of the total signal through a second stage of the PIC receiver, wherein the second stage is coupled to the first stage and wherein the transmission layer-specific updated equalization weights are determined without inverting a covariance matrix associated with the cleaned-up version of the total signal.

In a further embodiment, a method is provided for determining updated equalization weights after initial interference cancellation during an FD MMSE equalization in a multi-antenna wireless system having a multi-stage PIC receiver and operating in a wireless network that supports multiple transmission layers. The method comprises: obtaining transmission layer-specific updated equalization weights by using transmission layer-specific initial equalization weights applied during initial interference cancellation; and applying transmission layer-specific updated equalization weights, through a corresponding stage of the PIC receiver, to a cleaned-up version of a received signal resulting from the initial interference cancellation.

In another embodiment, a system is provided that comprises: a first communication unit; and a second communication unit. The first communication unit is configured to operate in a wireless network that supports multiple transmission layers. The second communication unit is configured to be in wireless communication with the first communication unit via the wireless network. The second communication unit has a plurality of receive antennas, and the second communication unit is further configured to: (i) receive a total signal from all receive antennas in the plurality of receive antennas, wherein the total signal includes all signals received by each receive antenna for all transmission layers at a predetermined subcarrier, (ii) perform initial interference suppression for the total signal using transmission layer-specific initial equalization weights applied to the total signal, wherein the initial interference suppression provides a corresponding equalized layer-specific signal for each transmission layer, (iii) process at least one equalized layer-specific signal to obtain a cleaned-up version of the total signal, and (iv) apply corresponding transmission layer-specific updated equalization weights to the cleaned-up version of the total signal, wherein the transmission layer-specific updated equalization weights are determined without inverting a covariance matrix associated with the cleaned-up version of the total signal.

Particular embodiments of the present disclosure may thus significantly reduce complexity of determining updated equalization weights during FD MMSE equalization, thereby saving computational resources in a digital receiver performing such equalization. Furthermore, because the matrix to be inverted (for obtaining updated equalization weights) at each stage of the PIC receiver may be of the dimension n×n (where "n" equals the total number of transmission layers in a transmission scheme (e.g., MIMO) used in the wireless network), the solutions described herein may be especially advantageous when the number of receive antennas is greater than the number of transmission layers. The described solutions can also be beneficial when the number of transmission layers that needs to be equalized again (re-equalized) is less than the number of total layers received originally. Additionally, particular embodiments of the described solutions can be applied to both uplink and downlink of LTE, and, thus, can be implemented in receivers in both eNB and UE.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of cellular or non-cellular wireless networks as well (for example, a corporate-wide wireless data network, a point-to-point wireless communication network such as a wireless walkie-talkie network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "pre-determined," "sub-frame," etc.) may be occasionally interchangeably used with its non-hyphenated version (e.g., "predetermined," "subframe," etc.), a capitalized entry (e.g., "Log-Likelihood Ratio") may be interchangeably used with its non-capitalized version (e.g., "log-likelihood ratio"), and plural terms may be indicated with or without an apostrophe (e.g., UE's or UEs). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams) shown and discussed herein are for illustrative purpose only, and are not drawn to scale.

Figure 2:
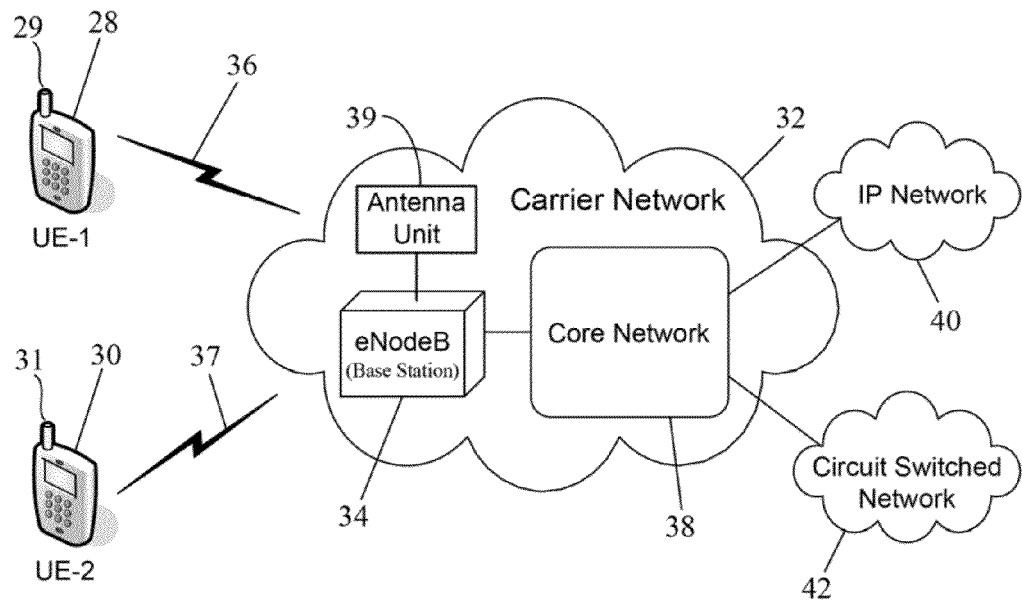
FIG. 2 is a diagram of an exemplary wireless system in which Frequency Domain (FD) Minimum Mean Squared Error (MMSE) equalization weight updates according to the teachings of one embodiment of the present invention may be implemented.

FIG. 2 is a diagram of an exemplary wireless system 25 in which FD MMSE equalization weight updates may be implemented. The system 25 may include a plurality of mobile handsets; two of which are shown in FIG. 2 and identified by reference numerals 28 and 30. Each mobile handset 28, 30 may include a corresponding antenna unit 29, 31. To facilitate downlink MIMO or other spatial diversity scheme, in one embodiment, the antenna units 29, 31 may include two or more receive antennas (not shown individually). The mobile handsets 28, 30 are shown to be in wireless communication with a carrier network 32 of a wireless service provider (or operator) through a communication node 34 of the carrier network 32. The communication node 34 may be, for example, a base station in a 3G network, or an evolved Node-B (eNodeB) or Home eNodeB (HeNB) when the carrier network is a Long-Term Evolution (LTE) network, or any other home base station or femtocell, and may provide radio interface to the mobile handsets 28, 30. In other embodiments, the communication node 34 may also include a site controller, an access point (AP), or any other type of radio interface device capable of operating in a wireless environment. It is noted here that the terms "mobile handset," "wireless handset," "terminal," and "user equipment (UE)" may be used interchangeably herein to refer to a wireless communication device that is capable of voice and/or data communication via a wireless carrier network: Some examples of such mobile handsets include cellular telephones or data transfer equipments (e.g., a Personal Digital Assistant (PDA) or a pager), smartphones (e.g., iPhone™, Android™, Blackberry™, etc.), computers, Bluetooth® devices, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UEs).

In addition to providing air interface or communication channel (e.g., as represented by wireless links 36-37 in FIG. 2) to the UEs 28, 30 via an antenna unit 39, the communication node 34 may also perform radio resource management (as, for example, in case of an eNodeB or HeNB in an LTE system) using, for example, channel feedbacks received from the UEs 28, 30 operating in the network 32. The carrier network 32 may support a spatial diversity or spatial multiplexing scheme having multiple transmission layers (e.g., MU-MIMO), and the communication channel (e.g., a Radio Frequency (RF) channel) (conveniently referred to herein as the "channel") between the base station and the wireless terminals may provide a conduit for the signals exchanged between the base station 34 and UEs 28, 30 under the spatial diversity scheme. The eNB antenna unit 39 may include two or more receive antennas to support spatial diversity at the eNB 34 (e.g., by facilitating reception of MIMO signals from multiple UEs 28, 30).

It is noted here that although the discussion hereinbelow is provided primarily in the context of MIMO layers, the term "transmission layer" (or simply the "layer"), as used herein, may include a MIMO stream, a signal transmitted by a transmit antenna without precoding (or beamforming), or a signal transmitted by a number of transmit antennas after precoding (or beamforming). Furthermore, different layers may belong to the same user or UE (e.g., in the case of SU-MIMO), or to different users or UEs (e.g., in case of MU-MIMO). Similarly, although the discussion below is provided primarily in the context of an LTE network, the described solutions may also apply to Wideband Code Division Multiple Access (WCDMA) systems, WCDMA-based HSPA systems, CDMA2000 systems, EV-DO systems, etc., when FD MMSE equalization is used in a multi-stage PIC receiver. Also, because the described solutions may be applied to both uplink and downlink signal receptions in LTE, the described solutions can be implemented in either a base station (e.g., the eNB 34) or a UE (e.g., the UE's 28, 30) or both. Therefore, in the discussion below, the term "wireless communication unit" (or, simply, "communication unit") may be used to refer to either of these entities—i.e., whether a base station or a UE.

Referring again to FIG. 2, in case of a 3G carrier network 32, the communication node 34 may include functionalities of a 3G base station along with some or all functionalities of a 3G Radio Network Controller (RNC) to perform detection of MIMO signals using interference cancellation methodology discussed later hereinbelow. Communication nodes in other types of carrier networks (e.g., 4G networks and beyond) also may be configured similarly. In one embodiment, the node 34 may be configured (in hardware, via software, or both) to implement the determination of updated FD MMSE equalization weights according to the described techniques. For example, when existing hardware architecture of the communication node 34 cannot be modified, the equalization weight determination methodology may be implemented through suitable programming of one or more processors (e.g., processor 104 (or, more particularly, processing unit 108) in FIG. 6) in the communication node 34. The execution of the program code (by a processor in the node 34) may cause the processor to determine updated equalization weights as discussed herein. Similarly, one or more of the UE's 28, 30 may be suitably configured (in hardware and/or software) to implement the equalization weight determination methodology described herein. On the other hand, the eNB 34 and the UE's 28, 30 (if applicable under the MIMO transmission scheme) may include a multi-stage PIC receiver (e.g., a PIC receiver similar to the PIC receiver 62 in FIG. 4) as part of their processing units (as shown by way of examples in FIGS. 5-6) and configured according to the described solutions to carry out desired weight computations. Thus, in the discussion below, although a communication unit—whether the communication node 34 or any of the UEs 28, 30—may be referred to as "performing," "accomplishing," or "carrying out" a function or process, it is evident to one skilled in the art that such performance may be technically accomplished in hardware and/or software as desired.

The carrier network 32 may include a core network 38 coupled to the communication node 34 and providing logical and control functions (e.g., subscriber account management, billing, subscriber mobility management, etc.) in the network 32. In case of an LTE carrier network, the core network 38 may be an Access Gateway (AGW). Regardless of the type of carrier network 32, the core network 38 may function to provide connection of one or more of the UEs 28, 30 to other mobile handsets operating in the carrier network 32 and also to other communication devices (e.g., wireline or wireless phones) or resources (e.g., an Internet website) in other voice and/or data networks external to the carrier network 32. In that regard, the core network 38 may be coupled to a packet-switched network 40 (e.g., an Internet Protocol (IP) network such as the Internet) as well as a circuit-switched network 42 such as the Public-Switched Telephone Network (PSTN) to accomplish the desired connections beyond the devices operating in the carrier network 32. Thus, through the communication node's 34 connection to the core network 38 and the handsets' radio link with the communication node 34, a user of the handset (e.g., UE 28 or 30) may wirelessly (and seamlessly) access many different resources or systems beyond those operating within the carrier network 32 of an operator.

As is understood, the carrier network 32 may be a cellular telephone network or a Public Land Mobile Network (PLMN) in which the UE's 28, 30 may be subscriber units. However, as mentioned before, the described solutions may be implemented in other non-cellular wireless networks as well (whether voice networks, data networks, or both). Furthermore, portions of the carrier network 32 may include, independently or in combination, any of the present or future wireline or wireless communication networks such as, for example, the PSTN, or a satellite-based communication link. Similarly, as also mentioned above, the carrier network 32 may be connected to the Internet via its core network's 38 connection to the IP (packet-switched) network 40 or may include a portion of the Internet as part thereof.

Figure 3:
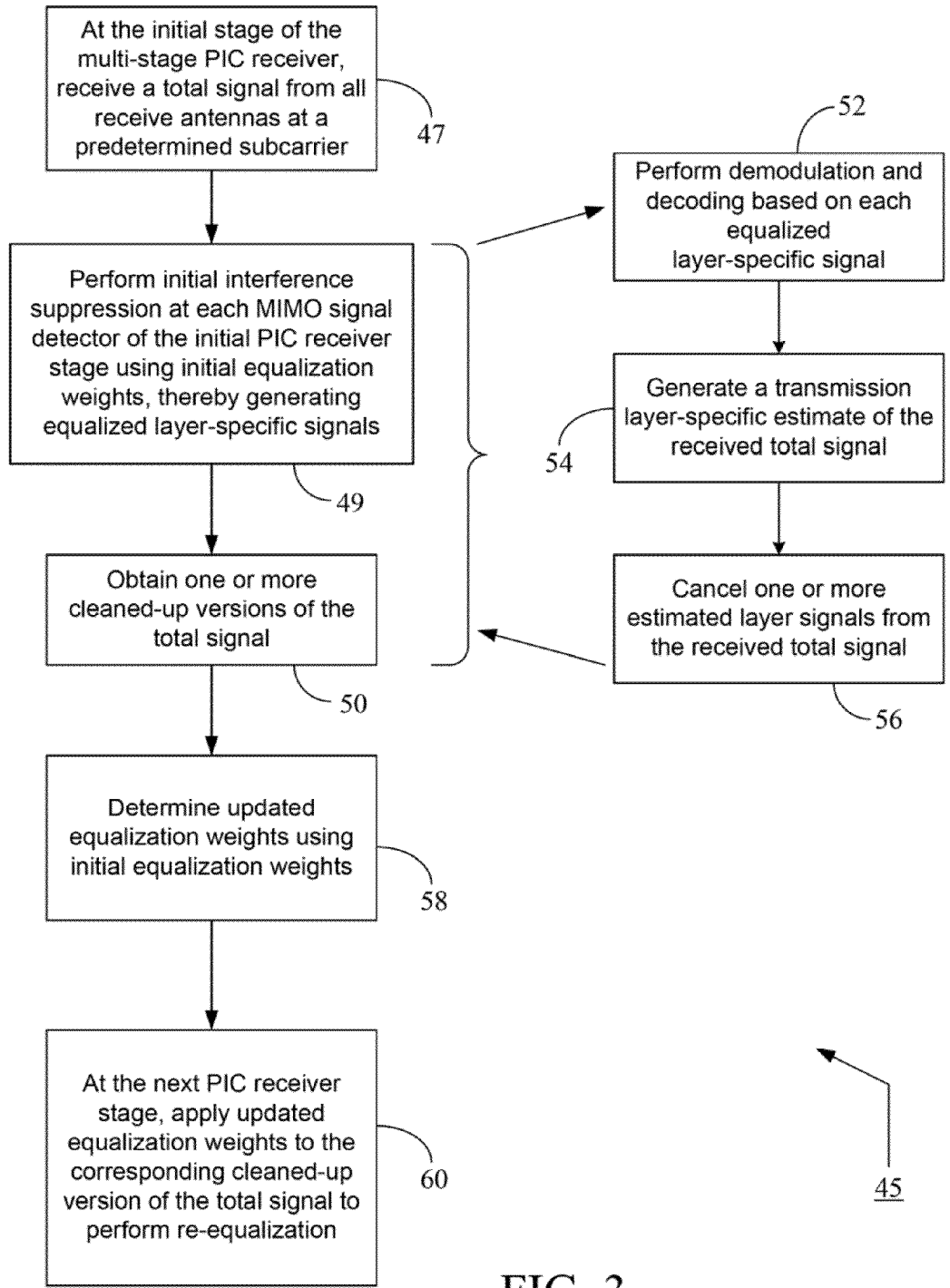
FIG. 3 depicts an exemplary flowchart to update FD MMSE equalization weights according to one embodiment of the present invention.

Prior to discussing mathematical details of determination of updated equalization weights according to the described solutions, a brief overview of the equalization process is provided with reference to FIG. 3, which depicts an exemplary flowchart 45 for updating FD MMSE equalization weights according to one embodiment of the described solutions. A widely used equalization solution for LTE is FD liner MMSE equalizer, which produces an MMSE estimate for each FD symbol received. The MMSE estimate for each FD symbol is obtained by linearly combining FD-received signals using MMSE combining weights (i.e., equalization weights). The FD-received signals are collected from multiple receive antennas of the communication unit (e.g., receive antennas in the antenna unit 39 of the base station 34, receive antennas in a multi-antenna UE, etc.), and the resulting signal (i.e., the signal collected from all receive antennas) may be referred to as a "total signal." A receiver (e.g., the multi-stage PIC receiver 62 in FIG. 4 discussed later hereinbelow) may initially receive the total signal (at an initial stage of the receiver) at a predetermined subcarrier k as indicated at block 47 in FIG. 3. Each MIMO signal detector of this initial stage in the multi-stage PIC receiver may be "assigned" a transmission layer (e.g., from multiple MIMO layers) and may provide that transmission layer-specific processing of the total signal. Each MIMO signal detector may receive the total signal and perform initial interference suppression using a set of initial equalization weights (block 49), thereby generating an equalized layer-specific signal for each received MIMO layer. In one embodiment, each MIMO signal detector may apply a corresponding layer-specific set of initial equalization weights. The initial interference suppression may be followed by initial interference cancellation to thereby obtain a cleaned-up version of the total signal for each received MIMO layer as indicated at block 50. It is noted here that the term "interference cancellation" means that an estimate of the received version of the interfering is obtained and cancelled from the total signal. On the other hand, "interference suppression" does not need to estimate the received version of an interfering signal, nor does it need to explicitly "subtract" the interference from the total signal. Thus, interference suppression may be less effective than interference cancellation, but simpler. In one embodiment, interference suppression may rely on the statistics of the interfering signal (e.g., impairment co-variance matrix), or statistics of the received total signal (which includes interference) such as, e.g., data co-variance matrix, in forming effective combining of equalization weights to maximize post-equalization signal-to-interference-plus-noise ratio (SINR). As SINR is maximized, the interference gets suppressed. Broadly speaking, interference suppression may be considered a part of interference cancellation.

As part of performing initial interference suppression and obtaining the cleaned-up version(s) of the total signal (after interference cancellation), each MIMO signal detector of the initial PIC receiver stage may perform demodulation and decoding based on each (initial) equalized layer-specific signal (block 52) and generate a transmission layer-specific estimate of the received total signal for each MIMO layer (block 54). Thereafter, each estimated layer signal may be used in processing the received total signal (block 56) to obtain one or more cleaned-up versions of the total signal (block 50). The cleaned-up versions of the total signal may be layer-specific. For example, the received total signal at subcarrier k, Y(k), may consist of layer signals $X_1(k)$ and $X_2(k)$, as well as other component U(k), which includes the thermal noise, and interference.

$$Y(k)=X_1(k)+X_2(k)+U(k)$$

Layer signals $X_1(k)$ and $X_2(k)$ are estimated in the initial stage, and their estimates $\hat{X}_1(k)$ and $\hat{X}_2(k)$ may be then used to obtain layer-specific cleaned-up versions of the total signal as follows. The layer-specific cleaned-up version of the total signal for further processing of the layer-1 signal may be obtained by cancelling out interference from the layer-2 signal, $$\hat{Y}_1(k)=Y(k)-\hat{X}_2(k).$$

Similarly, the layer-specific cleaned-up version of the total signal for further processing of the layer-2 signal may be obtained by cancelling out interference from the layer-1 signal, $$\hat{Y}_2(k)=Y(k)-\hat{X}_1(k).$$

On the other hand, a cleaned-up version of the total signal may be common to both layers. In this case, both $\hat{X}_1(k)$ and $\hat{X}_2(k)$ are cancelled from the received total signal $Y(k)$, resulting in the common cleaned-up signal (for both layers) $\hat{Y}(k)= Y(k)-\hat{X}_1(k)-\hat{X}_2(k)$. As part of the next iteration of equalization (i.e., re-equalization), the next stage of the PIC receiver (or another stage-specific or common-processing portion of the PIC receiver) may be configured to determine transmission layer-specific updated equalization weights using corresponding initial equalization weights and matrix inversion of significantly reduced complexity as discussed in more detail below (block 58). In one embodiment, such updated weights for each subsequent PIC receiver stage may be determined by a processing unit other than the PIC receiver itself, and the updated weights may be then supplied to each such subsequent stage of the PIC receiver. In the flowchart 45, the next stage of the PIC receiver may then apply the updated equalization weights to the corresponding cleaned-up version(s) of the total signal (generated at block 50) to perform re-equalization as indicated at block 60 in FIG. 3. The interference cancellation process may then repeat using this updated equalized signal in the manner similar to that indicated at blocks 50, 52, 54, and onwards. The number of iterations for re-equalizations (and associated interference cancellations), and, hence, the number of PIC receiver stages, may be selected as per design considerations.

Figure 1:
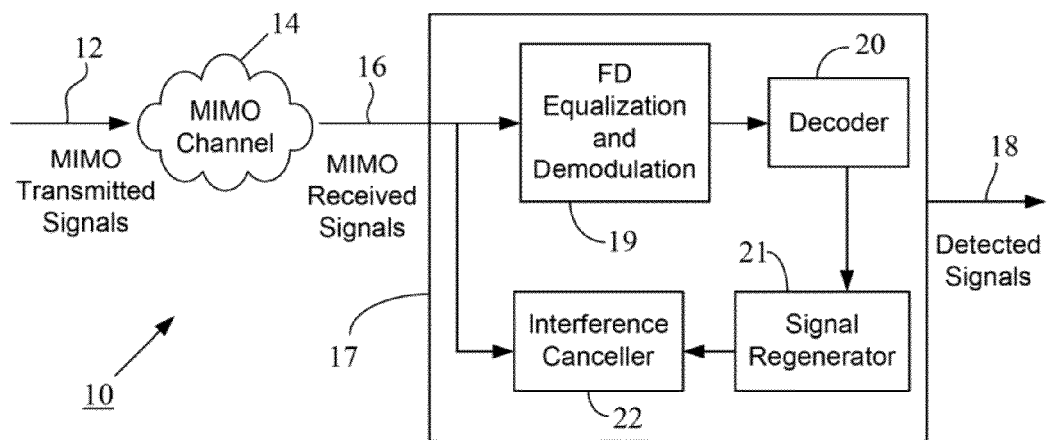
FIG. 1 illustrates an exemplary Multiple Input Multiple Output (MIMO) signal detection system.
Figure 4:
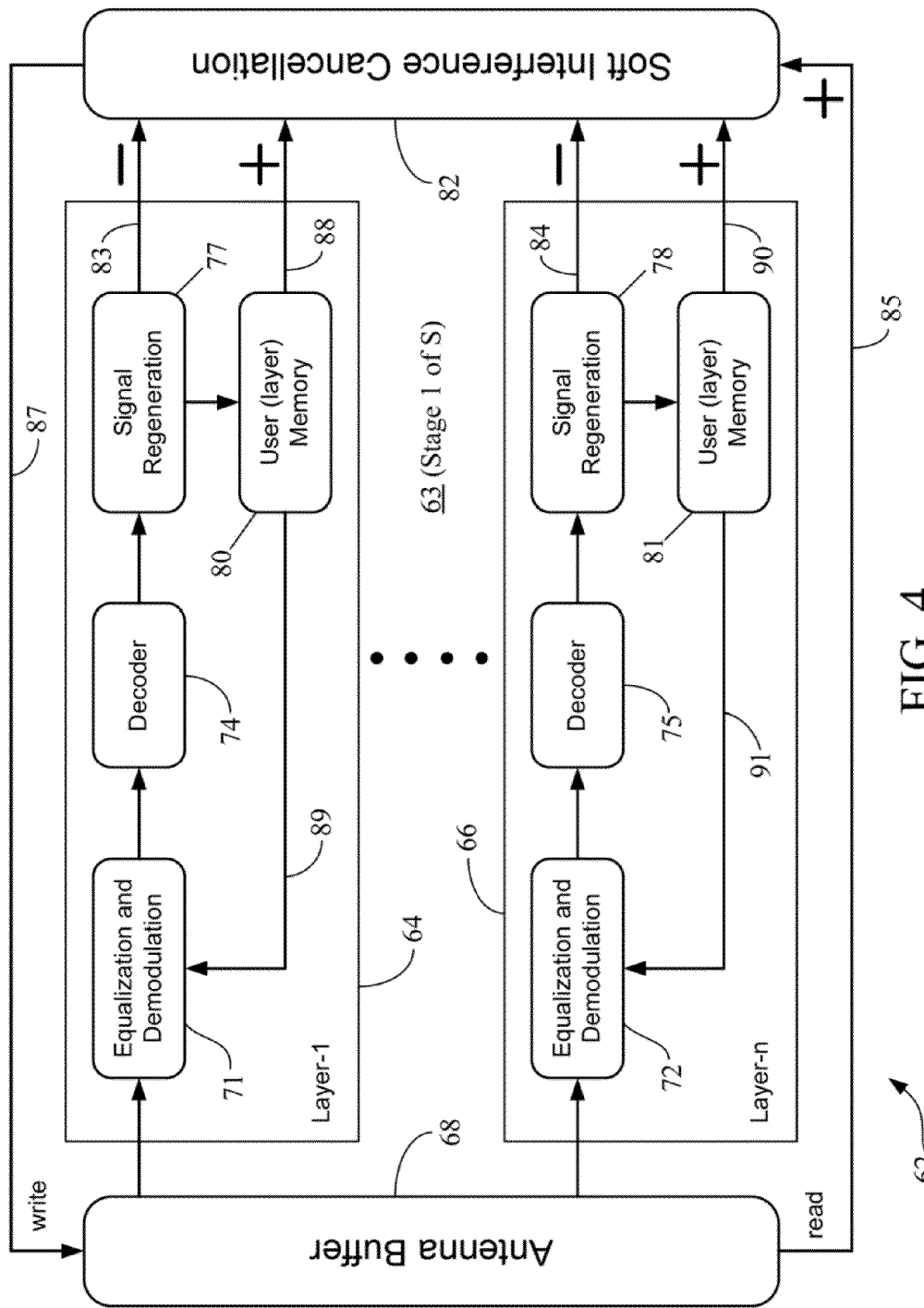
FIG. 4 shows an exemplary multi-stage Parallel Interference Cancellation (PIC) receiver according to one embodiment of the present invention.

FIG. 4 shows an exemplary multi-stage PIC receiver 62 according to one embodiment of the present invention. It is understood that a multi-stage PIC receiver can be used to improve performance for single-user (SU) and multi-user (MU) MIMO reception. The PIC receiver 62 may be a turbo equalization receiver and may be configured to perform the process illustrated in the flowchart 45 in FIG. 3 as part of turbo equalization carried out thereby. The PIC receiver 62 may include "S" stages, the initial one of which is identified as stage "63" in FIG. 4. Each subsequent stage (not shown in FIG. 4 for the sake of simplicity) in the PIC receiver 62 may be identical to stage 63 in configuration. In the PIC receiver 62, the initial stage (i.e., stage 63 in FIG. 4) may process all received MIMO signals in parallel and these multiple MIMO signals may be estimated and cancelled from the original total received signal as discussed above and below. Each subsequent stage (not shown) of the PIC receiver 62 may process signals for all MIMO layers that are found to be erroneous (e.g., having Cyclic Redundancy Check (CRC) failures) in the previous stage. Such processing may use a new cleaned-up version(s) of the processed "total signal", resulting from interference cancellation in the previous stage. If a MIMO signal detected in the previous stage is already deemed error free (e.g., having successful CRC checks), then there may be no need to process such a MIMO signal in subsequent stages. Each PIC receiver stage may include a plurality of MIMO signal detectors—each MIMO signal detector detecting a layer-specific MIMO signal. In the embodiment of FIG. 4, two such MIMO signal detectors 64, 66 processing two MIMO layer signals (for layer-1 and layer-n, respectively) are shown as an example to illustrate how this type of receiver works. These two layer signals may be from the same user (SU-MIMO) or from different users (MU-MIMO). Initially, the "total signal" may be received/stored in an antenna buffer 68 (which may be part of an antenna unit (e.g., the antenna unit 39 in FIG. 2), or of the PIC receiver 62 (as shown in FIG. 4), or some other entity (not shown) in the communication unit of which the PIC receiver 62 is a part) that may be accessed by each MIMO signal detector 64, 66 for stage-specific and transmission layer-specific signal processing. As shown in FIG. 4, the two layer signals are detected in parallel—i.e., interference cancellation (including equalization, demodulation, decoding, and estimation) of layer-specific signals may be performed in parallel across all MIMO signal detectors in the receiver stage 63. For that, each MIMO signal detector 64, 66 may include corresponding equalization and demodulation units 71-72, decoders 74-75, signal regeneration units 77-78, and user memories 80-81 as shown in FIG. 4. It is noted here that each MIMO signal detector in each stage of the PIC receiver 62 may appear architecturally similar to the detector 17 in FIG. 1, however, in particular embodiments each MIMO detector in each such stage in the PIC receiver 62 may be configured to carry out equalization as per the flowchart 45 in FIG. 3.

As shown in FIG. 4, each MIMO signal detector 64, 66 reads out the original received signal (i.e., the total signal) from the antenna buffer 68 and equalizes a layer-specific portion thereof. In FIG. 4, each of the decoders 74-75 generates a log-likelihood ratio (LLR) for each of the encoded bits received in the symbols constituting the layer-specific signals equalized (for initial interference suppression) and demodulated at corresponding units 71-72. These bit LLRs are used in a signal regeneration process at corresponding signal regeneration units 77-78 to obtain a respective estimate of the received version of each of the two layer signals. The regenerated (estimated) layer signals are cancelled from the total signal using a soft interference cancellation unit 82 (as represented by "minus" arrows 83-84), which may be coupled to the antenna buffer 68 to read the total signal therefrom (as indicated by arrow 85). Such cancellation may result in "cleaned-up" versions of the total signal as explained above. The cleaned-up versions of the received total signal may be written back to the antenna buffer 68 as indicated by arrow 87. The interference cancellation unit 82 may be part of the PIC receiver 62 (as shown in FIG. 4) or some other entity (not shown) in the communication unit of which the PIC receiver 62 is a part. Each MIMO signal detector 64, 66 may include a stage-specific and layer-specific user memory 80-81 to store a copy of the regenerated layer signal. In an iterative equalization scheme (e.g., in the multi-stage PIC receiver 62 performing turbo equalization), each layer signal may be equalized, demodulated, and decoded again in a parallel fashion through a corresponding receiver stage. As such, the cleaned-up versions of the received signal can be updated in each of the subsequent stages. However, the signal stored in the common antenna buffer 68 might be a cleaned-up version based on an earlier estimate of the layer signals. In that case, the earlier estimated layer signals may be added back first (as indicated by arrows 88-89 and 90-91) to the previously cleaned-up version, undoing the earlier interference cancellation, and then cancellation can be done based on the updated estimated layer signals available from signal regeneration units 77-78. For example, in the earlier-discussed example of two layer signals $X_1(k)$ and $X_2(k)$, the corresponding updated estimated layer signals may be obtained, namely $\hat{X}_1(k)$ and $\hat{X}_2(k)$. The new cleaned-up versions of the received signal can be obtained by $\tilde{Y}_1(k)=\hat{Y}_1(k)+\hat{X}_2(k)-\tilde{X}_2(k)$ and $\tilde{Y}_2(k)=\hat{Y}_2(k)+\hat{X}_1(k)-\tilde{X}_1(k)$. This results in layer-specific cleaned-up versions of the received signal. Alternatively, if a common cleaned-up version of the received signal is used, the new common cleaned-up version of the received signal can be obtained by $\tilde{Y}(k)=\hat{Y}(k)+\hat{X}_1(k)+\hat{X}_2(k)-\tilde{X}_1(k)-\tilde{X}_2(k)$. The new cleaned-up versions of the received signal can be used for re-equalization (or next iteration of equalization)—for signal detection.

A detailed mathematical discussion of equalization weight updates according to particular embodiments of the described solutions is now provided. As mentioned earlier, the MMSE estimate for each FD symbol is obtained by linearly combining FD-received signals/symbols (collected from multiple receive antennas) using layer-specific MMSE equalization weights, which are given by:

$$W_i(k) = R^{-1}(k) H_i(k), \tag{1}$$

where $$R(k) = H_1(k) H_1^H(k) + H_2(k) H_2^H(k) + R_U(k) \tag{2}$$

represents the covariance matrix of the received total signal at subcarrier k, subscript i is used to index a (MIMO) layer, k is the subcarrier index, $H_i(k)$ is a vector representing the frequency response for the i th layer signal (wherein the vector includes one frequency response element per receive antenna), $H_i^H(k)$ is a Hermitian (or conjugate transpose) of $H_i(k)$, and $R_U(k)$ is the impairment covariance matrix capturing the spatial correlation between the other impairment components (which may include the thermal noise contribution and interference contributed by other user signals that are not included in the multi-stage PIC based turbo equalization). It is noted here that the term "channel," as used herein, may refer to a single, physical over-the-air interface between the base station 34 and terminals 28, 30. However, between any two points (e.g., a transmit antenna and a receive antenna), there may be a specific effective channel (frequency) response, summarizing all the signal losses, signals bouncing off of obstacles, etc. This effective channel response between any such two points may be represented by a "channel coefficient" or "frequency response element." Thus, for example, for a specific received layer signal, two receive antennas (e.g., in the antenna unit 39) may be represented by two channel coefficients.

It is observed here that equations (1) and (2) provide an example with two MIMO layers (i=1, 2) for the sake of simplicity and ease of discussion only. In practice, more than 2 MIMO layers can be used, and in that case more $H_i(k) H_i^H(k)$ terms appear in equation (2). Further, it is assumed with respect to equations (1) and (2) that symbol energy is incorporated into the frequency response $H_i(k)$.

The equalization weights $W_i(k)$ (in equation (1)) may be used to combine the FD received total signal Y(k) to get FD MMSE symbol estimate for subcarrier k of layer i. This layer-specific estimated signal $S_i(k)$ may be given by:

$$S_i(k) = W_i^H(k) Y(k) \tag{3}$$

This simple MMSE equalizer (based on equations (1) through (3)) may achieve performance very close to the theoretical (channel) capacity in a Single Input Multiple Output (SIMO) channel. However, for MIMO reception, linear MMSE equalizer performance may be far from the capacity due to the presence of spatial-multiplexing interference.

In case of MIMO, after initial parallel interference suppression (e.g., as indicated at block 49 in FIG. 3, and as can be accomplished in the multi-stage PIC receiver 62 in FIG. 4), it can be shown that the FD MMSE updated equalization weights are of the form:

$$W_{x,i}(k) = R_x^{-1}(k) H_i(k), \tag{4}$$

where $$R_x(k) = \epsilon_1 H_1(k) H_1^H(k) + \epsilon_2 H_2(k) H_2^H(k) + R_U(k) \tag{5}$$

is a covariance matrix of the cleaned-up version(s) of the received total signal at sub-carrier k (i.e., received total signal after initial interference cancellation), and $\epsilon_i$ can be thought of as the residual power of layer i signal after interference cancellation. Thus, if a layer signal is completely cancelled, $\epsilon_i = 0$. In equations (4) and (5), an additional subscript "x" is introduced to denote that the variables in these equations correspond to post (initial) interference cancellation.

The complexity of re-equalization may reside largely in the computation of updated equalization weights for each layer signal. Such computation of updated equalization weights (for each cleaned-up signal) may require matrix inversions. It is noted here that matrix $R_x(k)$ is an $n_R$ by $n_R$ matrix (where $n_R$ is the number of receive antennas in the communication unit receiving MIMO layer signals), and repeatedly inverting such a matrix could be computationally costly when a large number of receive antennas are used.

However, according to one embodiment of the present invention, inverting $R_x(k)$ is not needed for obtaining the updated equalization weights $W_{x,i}(k)$. Instead, the updated equalization weights can be obtained by using the old equalization weights $W_i(k)$ as discussed below.

From equations (2) and (5), the received signal covariance matrix after initial interference cancellation (i.e., $R_x(k)$) can be related to the original one before cancellation (i.e., R(k)) as given below:

$$R_x(k) = R(k) - \eta_1 H_1(k) H_1^H(k) - \eta_1 H_2(k) H_2^H(k) \tag{6}$$

where $$\eta_i = 1 - \epsilon_i \tag{7}$$

It is noted here that according to the concept of soft symbol based interference cancellation like the one discussed in J. Axnas, Y.-P. E. Wang, M. Kamuf, and N. Andgart, "Successive Interference Cancellation Techniques for LTE Downlink," *IEEE PIMRC* 2011, September 2011, c, can be obtained using the statistics of the soft symbols formed (e.g., by the signal regeneration units 77-78 in FIG. 4) based on decoder soft outputs. As a result, q, in equation (7) can be computed.

The equalization weights for layer 1 signal (i.e., i=1 in $W_i(k)$ in equation (1)) before parallel interference cancellation may be derived as given below:

$$\begin{aligned} W_1(k) &= R^{-1}(k) H_1(k) = (R_x^{-1}(k) R_x(k)) R^{-1}(k) H_1(k) \\ &= R_x^{-1}(k) (R(k) - \eta_1 H_1(k) H_1^H(k) - \eta_2 H_2(k) H_2^H(k)) R^{-1}(k) H_1(k) \\ &= W_{x,1}(k) - \eta_1 W_{x,1}(k) (H_1^H(k) W_1(k)) - \eta_2 W_{x,2}(k) (H_2^H(k) W_1(k)) \\ &= W_{x,1}(k) (1 - \eta_1 H_1^H(k) W_1(k)) + W_{x,2}(k) (-\eta_2 H_2^H(k) W_1(k)). \end{aligned} \tag{8}$$

Similarly, the equalization weights for layer 2 signal (i.e., i=2 in $W_i(k)$ in equation (1)) before parallel interference cancellation are:

$$\begin{aligned} W_2(k) &= R^{-1}(k) H_2(k) = (R_x^{-1}(k) R_x(k)) R^{-1}(k) H_2(k) \\ &= R_x^{-1}(k) (R(k) - \eta_1 H_1(k) H_1^H(k) - \eta_2 H_2(k) H_2^H(k)) R^{-1}(k) H_2(k) \\ &= W_{x,2}(k) - \eta_1 W_{x,1}(k) (H_1^H(k) W_2(k)) - \eta_2 W_{x,2}(k) (H_2^H(k) W_2(k)) \\ &= W_{x,1}(k) (-\eta_1 H_1^H(k) W_2(k)) + W_{x,2}(k) (1 - \eta_2 H_2^H(k) W_2(k)). \end{aligned} \tag{9}$$

Putting the above two equations in a matrix form, one obtains:

$$[W_1(k), W_2(k)] = [W_{x,1}(k), W_{x,2}(k)]A \qquad (10)$$

where $$A = \begin{bmatrix} 1 - \eta_1 H_1^H(k)W_1(k) & -\eta_1 H_1^H(k)W_2(k) \\ -\eta_2 H_2^H(k)W_1(k) & 1 - \eta_2 H_2^H(k)W_2(k) \end{bmatrix} \qquad (11)$$

Thus, it is seen from equation (10) that the layer-specific post-interference cancellation weights (i.e., the updated equalization weights $W_{x,i}(k)$) can be obtained as a function of old equalization weights (i.e., the equalization weights $W_i(k)$ used for initial interference cancellation) as given below:

$$[W_{x,1}(k), W_{x,2}(k)] = [W_1(k), W_2(k)]A^{-1} \qquad (12)$$

The inversion of in equation (12) can also be directly expressed as function of $W_i(k)$ and $H_i(k)$. For example, from equation (11), $$A^{-1} = \frac{1}{\Delta} \begin{bmatrix} 1 - \eta_2 H_2^H(k)W_2(k) & \eta_1 H_1^H(k)W_2(k) \\ \eta_2 H_2^H(k)W_1(k) & 1 - \eta_1 H_1^H(k)W_1(k) \end{bmatrix} \qquad (13)$$

where $$\Delta = (1 - \eta_2 H_2^H(k)W_2(k))(1 - \eta_1 H_1^H(k)W_1(k)) - \eta_1 \eta_2 H_1^H(k)W_2(k)H_2^H(k)W_1(k) \qquad (14)$$

It is seen from equations (11) and (12) that in the 2 MIMO layer-based example discussed herein (i=1, 2), the size of the matrix A that needs to be inverted is 2×2, instead of $n_R$ by $n_R$. In other words, according to one embodiment of the present invention, the matrix inversion (equation (13)) required to obtain updated equalization weights may depend on the number of MIMO layers, but not on the number of receive antennas. Also, if some of the layers do not need to be equalized again (e.g., due to an already error-free detection during initial interference cancellation), their corresponding columns in $A^{-1}$ (in equation (13)) do not need to be computed. From equations (12) and (13) it is noted that the $j^{th}$ column of $A^{-1}$ are the coefficients that can be used to linearly multiply the old combining weights $W_1(k)$ and $W_2(k)$ to get $W_{x,j}(k)$ (j=1, 2). For example, in the 2 MIMO layer-based example discussed herein (e.g., in conjunction with the PIC receiver 62 in FIG. 4), if layer-2 does not need to be equalized again, then only the first column of $A^{-1}$ is needed. In such cases, the complexity of weight updates is further reduced—i.e., the complexity is even less than that required to invert a 2×2 matrix.

From the discussion of equations (12) and (13), it is seen that the described solutions may allow updated MMSE equalization weights to be computed much more efficiently after initial interference cancellation in a multi-stage PIC receiver. Because the dimension of matrix A in equation (11) is a function of the number of transmission layers (and not of the number of receive antennas, or $n_R$), the reduced-complexity matrix inversion in equation (12) may be especially advantageous when the number of receive antennas is greater than the number of transmission layers. Also, as discussed above, the complexity of matrix inversion may be further reduced when the number of layers that needs to be re-equalized is less than the number of total layers received originally.

Figure 5:
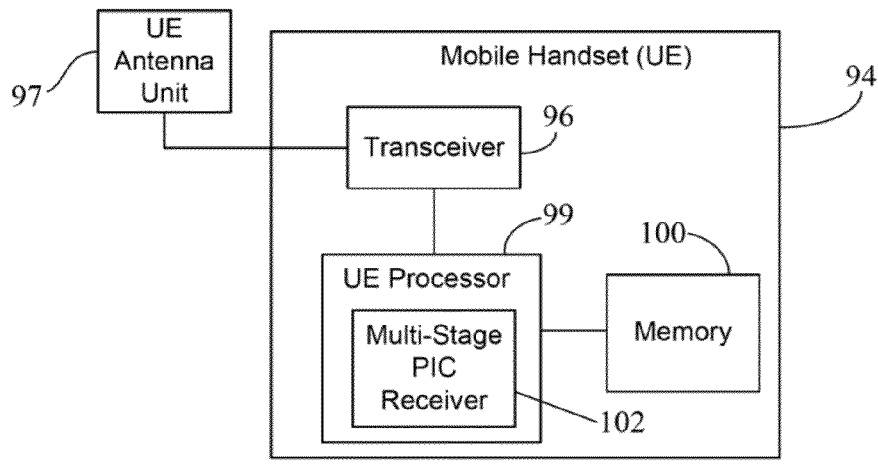
FIG. 5 is a block diagram of an exemplary mobile handset or UE according to one embodiment of the present invention.

FIG. 5 is a block diagram of an exemplary mobile handset or UE 94 in which the described solutions may be implemented. The UE 94 may represent either of the UE's 28, in FIG. 2. As shown in FIG. 5, the UE 94 may include a transceiver 96, an antenna unit 97, a processor 99, and a memory 100 (which may, in some embodiments, also include memory on UE's Subscriber Identity Module (SIM) card). The antenna unit 97 may include one or more transmit antennas (not shown), one or more receive antennas (not shown), or a single antenna for both transmission and reception. Because the described solutions related to determination of updated equalization weights may be equally applied to both uplink and downlink receptions in LTE, the UE 94 in the embodiment of FIG. 5 may also include a multi-stage PIC receiver 102 (which may be similar to the receiver 62 in FIG. 4) for interference cancellation of received downlink signals. The PIC receiver 102 may be a part of the UE's processor unit 99 as shown, or may be a separate unit coupled to the transceiver 96 and the processor 99 to perform the desired initial processing of received signals. Other arrangements to implement the functionality of the multi-stage PIC receiver 62 in the UE 94 may be devised as well. In particular embodiments, some or all of the functionalities described above (e.g., reception of MIMO signals from the eNB 34 using antennas in the antenna unit 97 and transceiver 96; interference cancellation of received MIMO signals via PIC receiver 102; determination of updated equalization weights during re-equalization; storage of regenerated signals in the memory 100 or in an internal memory (not shown) of the processor 99; transmission of channel feedbacks, etc., via PUCCH or PUSCH to eNB 34 using transceiver 96 and antenna 97; transmission and reception of MIMO signals in SU-MIMO and MU-MIMO schemes; etc.) as being provided by mobile communication devices or other forms of UE may be provided by the UE processor 99 (with processing support from the PIC receiver 102, as needed) executing instructions stored on a computer-readable medium, such as the memory 100 shown in FIG. 5. Alternative embodiments of the UE 94 may include additional components beyond those shown in FIG. 5 that may be responsible for enabling the UE's 94 communication with the base station 34 in the network 32 and for providing certain aspects of the UE's functionality, including any of the functionality described above and/or any functionality necessary to support the described solutions.

Figure 6:
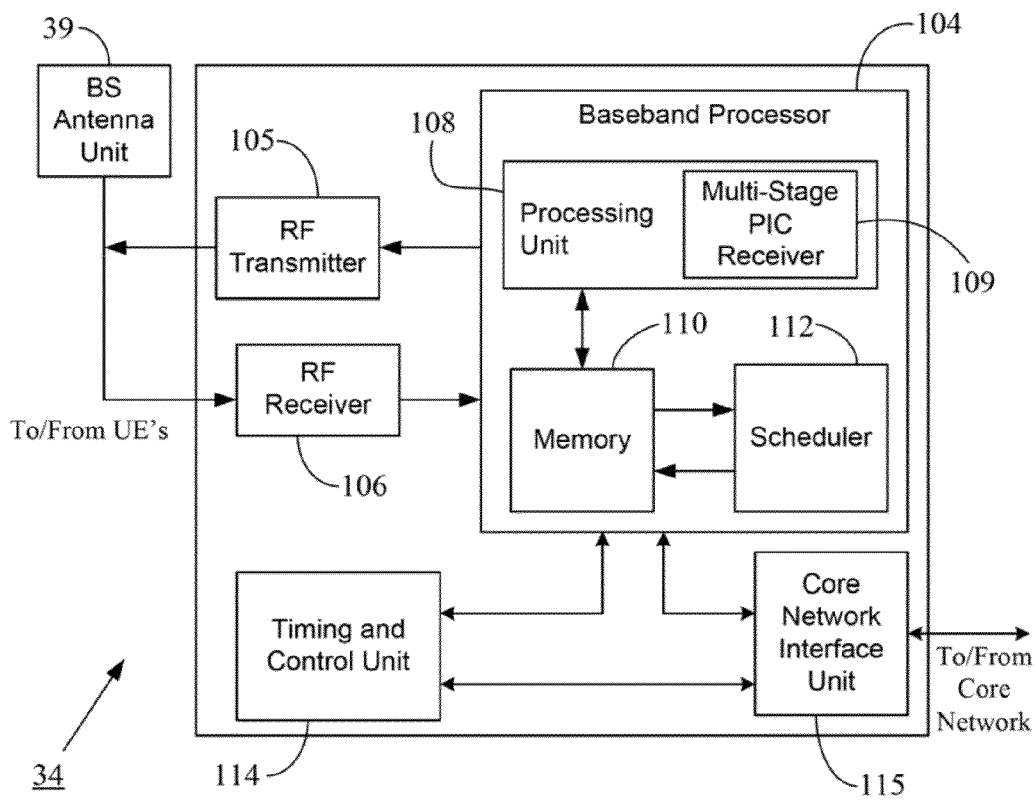
FIG. 6 is a block diagram of an exemplary eNB or a similar mobile communication node (or base station) according to one embodiment of the present invention.

FIG. 6 is a block diagram of an exemplary eNB or a similar mobile communication node (or base station) 34 according to one embodiment of the present invention. The eNB 34 may include a baseband processor 104 to provide radio interface with the mobile handsets (in the carrier network 32) via eNB's Radio Frequency (RF) transmitter 105 and RF receiver 106 units coupled to the eNB's antenna unit 39 (also shown in FIG. 2). In one embodiment, the processor 104 may receive transmissions from the UEs 28, 30 (e.g., MU-MIMO signals) via the combination of the antenna unit 39 and the receiver 106, whereas eNB's transmissions to the UEs 28, 30 may be carried out via the combination of the antenna unit 39 and the transmitter 105. The processor 104 may be configured (in hardware and/or software) to perform interference cancellation and to also determine updated equalization weights as part thereof. In that regard, the baseband processor 104 may include a processing unit 108 having a multi-stage PIC receiver 109 (which may be similar to the PIC receiver 62 in FIG. 4) to perform interference cancellation as described herein. In one embodiment, the PIC receiver 109 may be a separate unit coupled to the processing unit 108 and at least to the receiver 106 to perform the desired initial processing of received signals. Other arrangements to implement the functionality of the multi-stage PIC receiver 62 in the base station 34 in FIG. 6 may be devised as well. The processing unit 108 may be in communication with a memory 110 to process and store relevant information for the cell. A scheduler (e.g., the scheduler 112 in FIG. 6) in the eNB 34 may provide the scheduling decisions for UEs 28, 30 based on a number of factors such as, for example, QoS (Quality of Service) parameters, UE buffer status, uplink channel feedback report received from UEs 28, 30, UE capabilities, etc. The scheduler 112 may have the same data structure as a typical scheduler in an eNB in an LTE system.

The processor 104 may also provide additional baseband signal processing (e.g., mobile device registration, channel signal information transmission, radio resource management, etc.) as required. The processing unit 108 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a mobile base station, a base station controller, a node B, an enhanced node B, an HeNB, a home base station, a femtocell base station, and/or any other type of mobile communications node may be provided by the processing unit 108 executing instructions stored on a computer-readable data storage medium, such as the memory 110 shown in FIG. 6.

The eNB 34 may further include a timing and control unit 114 and a core network interface unit 115 as illustrated in FIG. 6. The control unit 114 may monitor operations of the processor 104 and the network interface unit 115, and may provide appropriate timing and control signals to these units. The interface unit 115 may provide a bi-directional interface for the eNB 34 to communicate with the core network 38 to facilitate administrative and call-management functions for mobile subscribers operating in the carrier network 32 through eNB 34.

Alternative embodiments of the base station 34 may include additional components responsible for providing additional functionality, including any of the functionality identified above and/or any functionality necessary to support the described solutions. Although features and elements are described above in particular combinations, each feature or element can be used alone without the other features and elements or in various combinations with or without other features and elements. The methodology provided herein (related to determination of updated equalization weights in FD MMSE equalization) may be implemented in a computer program, software, or firmware incorporated in a computer-readable storage medium (e.g., the memory 110 in FIG. 6) for execution by a general purpose computer or a processor (e.g., the processing unit 108 in FIG. 6 implementing the functionality of a multi-stage PIC receiver via the PIC receiver 109). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method to more efficiently compute updated MMSE equalization weights in a multi-stage PIC receiver after initial interference cancellation. The updated equalization weights (which are to be used during re-equalization) can be obtained using the old equalization weights already computed for initial interference cancellation. Thus, there is no need to invert an $n_R$ by $n_R$ matrix (where $n_R$ is the number of receive antennas) at each stage of the PIC receiver during each iteration of equalization and decoding operations. Rather, the matrix to be inverted (for obtaining updated equalization weights) at each stage of the PIC receiver may be of the dimension n×n (where "n" equals the total number of transmission layers in a transmission scheme (e.g., MIMO) used in the wireless network). Particular embodiments of the described solutions thus significantly reduce the complexity of determining updated equalization weights during FD MMSE equalization, thereby saving computational resources in a digital receiver performing such equalization. As mentioned earlier, the methodology described herein may be especially advantageous when the number of receive antennas is greater than the number of transmission layers. The described scheme can also be beneficial when the number of transmission layers that needs to be re-equalized is less than the number of total layers received originally. Additionally, particular embodiments of the proposed solutions can be applied to both uplink and downlink receptions, and, thus, can be implemented in both eNB and UE.

It is noted here that the described solutions related to computation of updated FD MMSE equalization weights in a multi-stage PIC receiver may be applied, with suitable modifications (as may be apparent to one skilled in the art using the present teachings), to a number of different wireless systems or networks, such as, for example, networks/systems using 3G/4G specifications. Some examples of such systems or networks include, but not limited to, Global System for Mobile communications (GSM) networks, LTE networks, LTE-Advanced networks, UTRAN/E-UTRAN networks, WCDMA systems, WCDMA-based HSPA systems, CDMA2000 systems, GSM/Enhanced Data Rate for GSM Evolution (GSM/EDGE) systems, EV-DO systems, and WiMAX systems.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing Frequency Domain (FD) Minimum Mean Squared Error (MMSE) equalization in a multi-antenna wireless communication unit having a multi-stage Parallel Interference Cancellation (PIC) receiver and operating in a wireless network that supports multiple transmission layers, the method comprising the steps of:

using the PIC receiver, performing initial interference suppression for a total signal received from all receive antennas in the communication unit, the initial interference suppression being performed at each transmission layer-specific detector unit in a first stage of the PIC receiver using transmission layer-specific initial subcarrier dependent equalization weights applied to the total signal, wherein the total signal includes all signals received by each receive antenna for all transmission layers at a predetermined subcarrier, and wherein the initial interference suppression provides a corresponding equalized layer-specific signal for each transmission layer;

using the PIC receiver, processing at least one equalized layer-specific signal to obtain a cleaned-up version of the total signal as a result of initial interference cancellation performed at the first stage of the PIC receiver; and through a second stage of the PIC receiver, applying corresponding transmission layer-specific updated sub-carrier dependent equalization weights to the cleaned-up version of the total signal, wherein the second stage is coupled to the first stage and wherein the transmission layer-specific updated sub-carrier dependent equalization weights are determined without inverting a covariance matrix associated with the cleaned-up version of the total signal.

2. The method of claim 1, further comprising the step of:
using the PIC receiver, determining the transmission layer-specific updated equalization weights.

3. The method of claim 2, wherein the step of determining the updated equalization weights includes:
obtaining the transmission layer-specific updated equalization weights by using the transmission layer-specific initial equalization weights.

4. The method of claim 2, wherein the step of determining the updated equalization weights includes:
obtaining the transmission layer-specific updated equalization weights by inverting an n×n matrix that is based on the transmission layer-specific initial equalization weights and transmission layer-specific frequency responses of a channel in the wireless network associated with all receive antennas in the wireless communication unit, wherein "n" represents the total number of transmission layers.

5. The method of claim 4, wherein n=2, and wherein the n×n matrix is given by:

$$A = \begin{bmatrix} 1 - \eta_1 H_1^H(k) W_1(k) & -\eta_1 H_1^H(k) W_2(k) \\ -\eta_2 H_2^H(k) W_1(k) & 1 - \eta_2 H_2^H(k) W_2(k) \end{bmatrix}$$

wherein $\eta_i$ relates to residual power of a transmission layer-specific signal for $i^{th}$ transmission layer after initial interference cancellation, k represents the pre-determined subcarrier, $H_i(k)$ is a vector representing the frequency response of the channel for the transmission layer-specific signal for $i^{th}$ transmission layer, $H_i^H(k)$ is conjugate transpose of $H_i(k)$, and $W_i(k)$ represents transmission layer-specific initial equalization weights associated with the $i^{th}$ transmission layer.

6. The method of claim 1, wherein the step of performing initial interference suppression includes:
performing detector unit-specific initial interference suppression in parallel across all layer-specific detector units in the first stage of the PIC receiver.

7. The method of claim 1, wherein the steps of performing initial interference suppression and obtaining the cleaned-up version of the total signal together include:
performing demodulation and subsequent decoding of the at least one equalized layer-specific signal at a corresponding layer-specific detector unit in the first stage of the PIC receiver, thereby generating a corresponding layer-specific decoded signal;
using each corresponding layer-specific decoded signal to generate a respective estimate of each transmission layer-specific signal received by the communication unit at the predetermined subcarrier; and
cancelling a predetermined set of transmission layer-specific estimates from the total signal to obtain the cleaned-up version of the total signal.

8. The method of claim 1, wherein each transmission layer includes one of the following:
a Multiple Input Multiple Output (MIMO) stream;
a signal transmitted without precoding; and
a signal transmitted after precoding.

9. The method of claim 1, wherein the step of processing at least one equalized layer-specific signal includes:
processing the at least one equalized layer-specific signal to obtain a layer-specific cleaned-up version of the total signal for each corresponding transmission layer.

10. A multi-stage Parallel Interference Cancellation (PIC) receiver for use in a multi-antenna wireless communication unit to provide Frequency Domain (FD) Minimum Mean Squared Error (MMSE) equalization when the communication unit is operating in a wireless network that supports multiple transmission layers, wherein the multi-stage PIC receiver is configured to:
perform initial interference suppression for a total signal received from all receive antennas in the communication unit, the initial interference suppression being performed at each transmission layer-specific detector unit in a first stage of the PIC receiver using transmission layer-specific initial sub-carrier dependent equalization weights applied to the total signal, wherein the total signal includes all signals received by each receive antenna for all transmission layers at a predetermined subcarrier, and wherein the initial interference suppression provides a corresponding equalized layer-specific signal for each transmission layer;
process at least one equalized layer-specific signal to obtain a cleaned-up version of the total signal as a result of initial interference cancellation performed at the first stage of the PIC receiver;
determine transmission layer-specific updated sub-carrier dependent equalization weights by using the transmission layer-specific initial equalization weights; wherein the transmission layer-specific updated sub-carrier dependent equalization weights are determined without inverting a covariance matrix associated with the cleaned-up version of the total signal; and
apply corresponding transmission layer-specific updated sub-carrier dependent equalization weights to the cleaned-up version of the total signal through a second stage of the PIC receiver.

11. The multi-stage PIC receiver of claim 10, further configured to:
obtain the transmission layer-specific updated equalization weights by inverting an n×n matrix that is based on the transmission layer-specific initial equalization weights and transmission layer-specific frequency responses of a channel in the wireless network associated with all receive antennas in the wireless communication unit, wherein "n" represents the total number of transmission layers.

12. The multi-stage PIC receiver of claim 10, further configured to:
perform demodulation and subsequent decoding of the at least one equalized layer-specific signal at a corresponding layer-specific detector unit in the first stage of the PIC receiver, thereby generating a corresponding layer-specific decoded signal;
use each corresponding layer-specific decoded signal to generate a respective estimate of each transmission layer-specific signal received by the communication unit at the predetermined subcarrier; and cancel a predetermined set of transmission layer-specific estimates from the total signal to obtain the cleaned-up version of the total signal.

13. A wireless communication unit configured to operate in a wireless network that supports multiple transmission layers, the communication unit comprising:
a plurality of receive antennas, wherein each receive antenna in the plurality of receive antennas is configured to receive signals for all transmission layers; and
a multi-stage Parallel Interference Cancellation (PIC) receiver coupled to the plurality of receive antennas, wherein the multi-stage PIC receiver is configured to:
receive a total signal from all receive antennas in the plurality of receive antennas, wherein the total signal includes all signals received by each receive antenna for all transmission layers at a predetermined subcarrier,
perform initial interference suppression for the total signal at each transmission layer-specific detector unit in a first stage of the PIC receiver using transmission layer-specific initial sub-carrier dependent equalization weights applied to the total signal, wherein the initial interference suppression provides a corresponding equalized layer-specific signal for each transmission layer,
process at least one equalized layer-specific signal to obtain a cleaned-up version of the total signal as a result of initial interference cancellation performed at the first stage of the PIC receiver, and
apply corresponding transmission layer-specific updated sub-carrier dependent equalization weights to the cleaned-up version of the total signal through a second stage of the PIC receiver, wherein the second stage is coupled to the first stage and wherein the transmission layer-specific updated sub-carrier dependent equalization weights are determined without inverting a covariance matrix associated with the cleaned-up version of the total signal.

14. The wireless communication unit of claim 13, wherein the PIC receiver is configured to provide Frequency Domain (FD) Minimum Mean Squared Error (MMSE) equalization to the total signal.

15. The wireless communication unit of claim 14, wherein the PIC receiver is further configured to:
perform demodulation and subsequent decoding of the at least one equalized layer-specific signal at a corresponding layer-specific detector unit in the first stage of the PIC receiver, thereby generating a corresponding layer-specific decoded signal;
use each corresponding layer-specific decoded signal to generate a respective estimate of each transmission layer-specific signal received by the communication unit at the predetermined subcarrier; and
cancel a predetermined set of transmission layer-specific estimates from the total signal to obtain the cleaned-up version of the total signal.

16. The wireless communication unit of claim 13, wherein the cleaned up version of the total signal includes a layer-specific cleaned-up version of the total signal for each corresponding transmission layer.

17. In a method to determine updated equalization weights after initial interference cancellation for a received signal during a Frequency Domain (FD) Minimum Mean Squared Error (MMSE) equalization in a multi-antenna wireless system having a multi-stage Parallel Interference Cancellation (PIC) receiver and operating in a wireless network that supports multiple transmission layers, the improvement comprising:
obtaining transmission layer-specific updated sub-carrier dependent equalization weights by using transmission layer-specific initial sub-carrier dependent equalization weights that are applied during initial interference cancellation; to obtain a cleaned-up version of the received signal, wherein the transmission layer-specific updated sub-carrier dependent equalization weights are obtained without inverting a covariance matrix associated with the cleaned-up version of the received signal; and
applying the transmission layer-specific updated sub-carrier dependent equalization weights, through a corresponding stage of the PIC receiver, to the cleaned-up version of the received signal resulting from the initial interference cancellation.

18. The method of claim 17, wherein the improvement further comprises:
obtaining the updated equalization weights without inverting a covariance matrix associated with the cleaned-up version of the received signal.

19. A system comprising:
a first communication unit configured to operate in a wireless network that supports multiple transmission layers; and
a second communication unit configured to be in wireless communication with the first communication unit via the wireless network, wherein the second communication unit has a plurality of receive antennas, and wherein the second communication unit is further configured to:
receive a total signal from all receive antennas in the plurality of receive antennas, wherein the total signal includes all signals received by each receive antenna for all transmission layers at a predetermined subcarrier,
perform initial interference suppression for the total signal using transmission layer-specific initial sub-carrier dependent equalization weights applied to the total signal, wherein the initial interference suppression provides a corresponding equalized layer-specific signal for each transmission layer,
process at least one equalized layer-specific signal to obtain a cleaned-up version of the total signal, and
apply corresponding transmission layer-specific updated sub-carrier dependent equalization weights to the cleaned-up version of the total signal, wherein the transmission layer-specific updated sub-carrier dependent equalization weights are determined without inverting a covariance matrix associated with the cleaned-up version of the total signal.

20. The system of claim 19, wherein each transmission layer includes one of the following:
a Multiple Input Multiple Output (MIMO) stream;
a signal transmitted without precoding; and
a signal transmitted after precoding.

* * * * *

UNITED STATES PATENT AND TRADEMARK OFFICE
CERTIFICATE OF CORRECTION

| | | |
|---|---|---|
| PATENT NO. | : 9,042,428 B2 | Page 1 of 1 |
| APPLICATION NO. | : 13/463974 | |
| DATED | : May 26, 2015 | |
| INVENTOR(S) | : Wang | |

It is certified that error appears in the above-identified patent and that said Letters Patent is hereby corrected as shown below:

In the specification,

In Column 8, Line 1, delete "network:" and insert -- network. --, therefor.

In Column 14, Line 39, delete "c," and insert -- $\varepsilon_i$ --, therefor.

In Column 14, Line 42, delete "q," and insert -- $_i$ --, therefor.

In Column 15, Line 18, delete "of in" and insert -- of $A^{-1}$ in --, therefor.

In Column 15, Line 67, delete "UE's 28," and insert -- UE's 28, 30 --, therefor.

Signed and Sealed this
Twenty-fourth Day of November, 2015

Michelle K. Lee
*Director of the United States Patent and Trademark Office*